US008454067B2

(12) United States Patent
Weaver et al.

(10) Patent No.: US 8,454,067 B2
(45) Date of Patent: Jun. 4, 2013

(54) ADJUSTABLE GRIPPER HEAD ASSEMBLY (75) Inventors: J. Michael Weaver, Madison, CT (US); Orlando Sanchez, II, Manchester, CT (US)

(73) Assignee: Standard Knapp Inc., Portland, CT (US)

( * ) Notice: Subject to any disclaimer, the term of this patent is extended or adjusted under 35 U.S.C. 154(b) by 170 days.

(21) Appl. No.: 12/913,920

(22) Filed: Oct. 28, 2010

(65) Prior Publication Data

US 2012/0104782 A1 May 3, 2012

(51) Int. Cl.
*B66C 1/42* (2006.01)
(52) U.S. Cl.
USPC .......................... 294/87.1; 294/65; 198/468.3
(58) Field of Classification Search
USPC .............. 294/64.2, 65, 183, 188, 87.1, 87.22; 198/468.3, 468.4; 414/416.02
See application file for complete search history.

(56) References Cited

U.S. PATENT DOCUMENTS

| 2,903,290 | A | * | 9/1959 | Morris et al. | 294/65 |
|---|---|---|---|---|---|
| 4,861,085 | A | * | 8/1989 | Lock et al. | 294/87.1 |
| 5,778,525 | A | * | 7/1998 | Hata et al. | 29/836 |
| 5,931,279 | A | * | 8/1999 | Pedrotto et al. | 198/468.3 |
| 5,943,842 | A | * | 8/1999 | de Koning et al. | 53/247 |
| 6,863,323 | B2 | * | 3/2005 | Neveu | 294/65 |
| 2009/0229227 | A1 | | 9/2009 | Raudat et al. | |
| 2010/0180544 | A1 | | 7/2010 | Devaux | |

FOREIGN PATENT DOCUMENTS

| JP | 11-245186 A | 9/1999 |
|---|---|---|
| WO | 2006098556 A1 | 9/2006 |

OTHER PUBLICATIONS

Notification of Transmittal of the International Search Report and the Written Opinion of the International Searching Authority; PCT/US2011/055769; mailed May 4, 2012; 9 pages.

* cited by examiner

*Primary Examiner* — Dean Kramer
*Assistant Examiner* — Stephen Vu
(74) *Attorney, Agent, or Firm* — Cantor Colburn LLP (57) ABSTRACT

A gripper head assembly for a product processing machine includes a gripper support and a plurality of grippers secured to the gripper support to grip a plurality of product routed through the product processing machine. The gripper head assembly is configured such that a spacing of the plurality of grippers is changeable relative to the gripper support. A product processing machine includes a grid assembly for guiding product to a destination and a gripper head assembly for gripping product and guiding the product into the grid assembly. The gripper head assembly includes a gripper support and a plurality of grippers secured to the gripper support to grip a plurality of product routed through the product processing machine. The gripper head assembly is configured such that a spacing of the plurality of grippers is changeable relative to the gripper support.

16 Claims, 7 Drawing Sheets

ADJUSTABLE GRIPPER HEAD ASSEMBLY

BACKGROUND

The subject matter disclosed herein relates to automated packaging machines. More specifically, the subject disclosure relates to an adjustable gripper head assembly for automated packaging machines.

Automated packaging devices are often used in high volume production facilities to prepare products for sale and shipment. One type of automated packaging device is a continuous motion packaging machine. In such a packaging machine, an infeed section gathers product, for example, bottles, and moves the product along in a flow direction toward a grouper section. The grouper section collates product into a number of individual lanes. The product then moves to a gripper section where the product is gripped and moved into a case or other package in a case feed section.

The gripper section typical includes a plurality of gripper head assemblies, with each gripper head assembly including a plurality of grabbers which close around a product in the grouper section to grip the product and move the product to the case feed section where the product is placed in a package when the grabbers release the product. A typical gripper head assembly is configured to be used with a single size or shape of product such that when it is desired to process different sizes or shapes of product through the automated packaging device, the gripper head assembly must be replaced with one which is compatible with that product. Replacement of gripper head assemblies decreases flexibility of the automated packaging machine and substantially increases changeover time from processing one product to another. Further, the cost of operation of the automated packaging machine is substantially increased since, for each size or shape of product, separate gripper head assemblies must be procured.

BRIEF DESCRIPTION

A gripper head assembly for a product processing machine includes a gripper support and a plurality of grippers secured to the gripper support to grip a plurality of product routed through the product processing machine. The gripper head assembly is configured such that a spacing of the plurality of grippers is adjustable relative to the gripper support.

A product processing machine includes a grid assembly for guiding product into a case and a gripper head assembly for gripping product and guiding the product into the grid assembly. The gripper head assembly includes a gripper support and a plurality of grippers secured to the gripper support to grip a plurality of product routed through the product processing machine. The gripper head assembly is configured such that a spacing of the plurality of grippers is adjustable relative to the gripper support.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
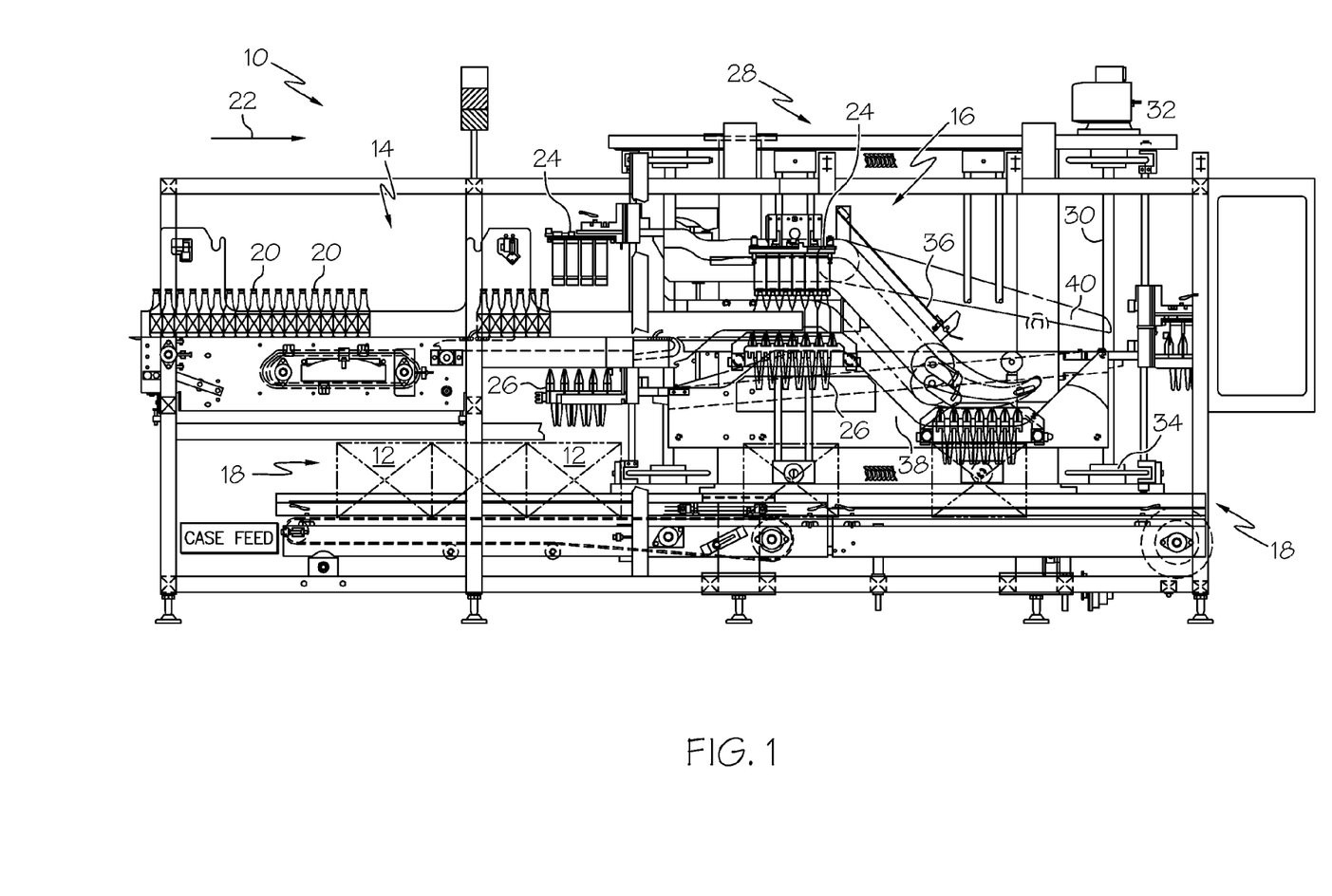
FIG. 1 is a schematic view of an embodiment of a packaging machine.

Referring to FIG. 1, an overview of an automated packaging machine 10, such as a continuous motion packaging machine, is shown, with the product 20 flowing from left to right. It is to be understood that the illustration of FIG. 1 is not for limitation and is merely for environment of the adjustable gripper head and that the adjustable gripper head can be used on many different types of machines including continuous motion machines, discontinuous motion machines, pick and place machines, etc. Further, although shown as moving from left to right, it should be understood that a reverse configuration of the packaging machine 10 is also possible, and therefore the flow direction 22 depicted should not be construed as limiting the packaging machine 10 from moving product 20 in other directions. The product 20, as exemplarily shown in FIG. 1, are bottles, however other product types are within the scope of the packaging machine 10. The packaging machine 10 includes an infeed section (not shown). The infeed section gathers product 20 and move it along the flow direction 22. The infeed section then pushes the product 20 to a grouper section 14. Grouper section 14 collates product 20 into individual lanes, and also separates the product into sections to prepare the product for gripper/grid section 16. Product 20 then moves to gripper/grid section 16, where product 20 is gripped and then lowered into a case in case feed section 18.

Gripper/grid section 16 includes a plurality of gripper head assemblies 24 and grid assemblies 26. The gripper head assemblies 24 and grid assemblies 26 are arranged in pairs about a carousel 28 driven by a motor that operates a drive shaft 30 which rotates drive sprockets 32 and 34 positioned at first and second ends of the drive shaft 30.

The packaging machine includes a cam device 36 that includes a converging side 38, where the gripper head assembly 24 and the grid assembly 26 are brought together, and a separating side 40 where the gripper head assembly 24 and the grid assembly 26 are separated from each other. The gripper head assembly 24 and the grid assembly 26 travel continuously about the cam device 36, where they converge on the converging side 38 to package product 20 into a case 12, and where they separate on the separating side 40 to make a return trip to the converging side 38 for packaging more product 20.

As shown in FIG. 1, as the product is being gripped by the gripper head assembly 24, the grid assembly 26 is positioned directly below the gripper head assembly 24 for eventually guiding the product set into a case 12. The case feed section 18 feeds a case 12 for positioning below the grid assembly 26. The gripper head assembly 24 engages with the grid assembly 26 to allow the product 20 to drop through the grid assembly 26 into the case 12.

Figure 2:
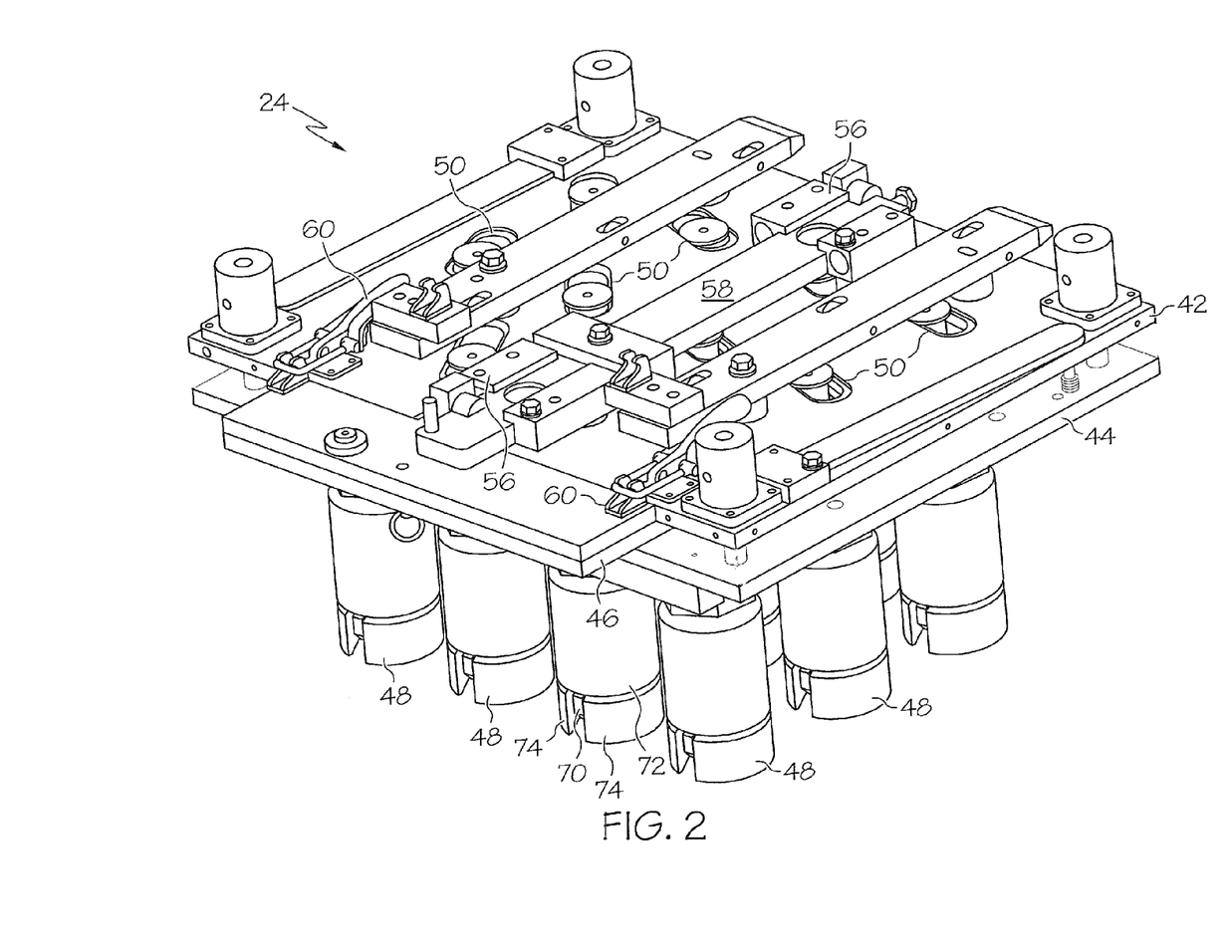
FIG. 2 is a perspective view of an embodiment of an adjustable gripper head assembly for a packaging machine.

Referring to FIG. 2, the gripper head assembly 24 includes a gripper support. The gripper support comprises a first plate 42, which in operation is an upper plate, and a second plate 44, which in operation is a lower plate. An adjuster plate 46 is located between the first plate 42 and the second plate 44, and in operation is a middle plate.

A plurality of grippers 48 are secured to the gripper head assembly 24 for engaging with the heads of product 20. In some embodiments, the plurality of grippers 48 are engaged to the product 20 by increasing a spacing between the first plate 42 and the second plate 44 by, for example, moving the first plate 42. Moving the first plate 42 in this manner causes the grippers 48 to grip the product 20. For example, as shown in FIG. 2, each gripper includes an inner sleeve 70 and an outer sleeve 72 having two arms 74. The arms 74 are held in an open position by the inner sleeve 70. When the spacing between the first plate 42 and the second plate 44 is increased, by moving the first plate 42 upward, the outer sleeve 72 is forced downwardly relative to the inner sleeve 72, moving arms 74 off of the inner sleeve 70, thus allowing the arms 74 to move toward a closed position and grip the product 20. To release the product 20 when desired, the spacing between the first plate 42 and the second plate 44 is decreased by, for example, moving the first plate 42 toward the second plate 44. The number of grippers 48 should correspond to the number of product in a product set. Although it would be possible in some embodiments to provide more grippers 48 than necessary, the packaging machine 10 would fail to package the product appropriately if there were fewer grippers 48 than necessary. Also, at least the required number of grippers 48 should be arranged in a manner, which corresponds to the arrangement of product passing into the gripper/grid section 16. In the illustrated embodiment, each product set includes four lanes of six bottles passed to the gripper/grid section 16 from the grouper section 14, and therefore the gripper head assembly 24 includes twenty-four grippers 48 arranged in four rows and six columns. Of course, other arrangements of grippers 48 are within the scope of gripper head assemblies 24 usable with the packaging machine 10.

Figure 3:
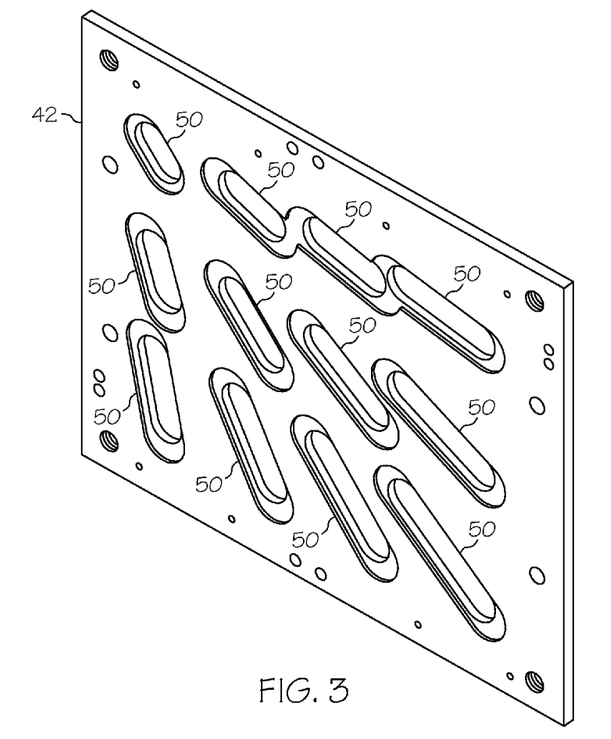
FIG. 3 is a perspective view of an embodiment of a first plate for a packaging machine.
Figure 4:
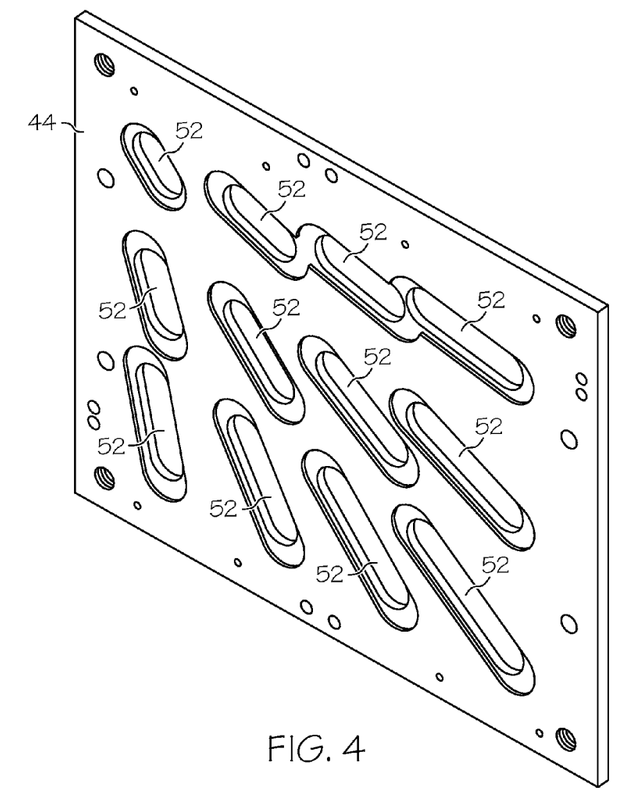
FIG. 4 is a perspective view of an embodiment of a second plate for a packaging machine.
Figure 5:
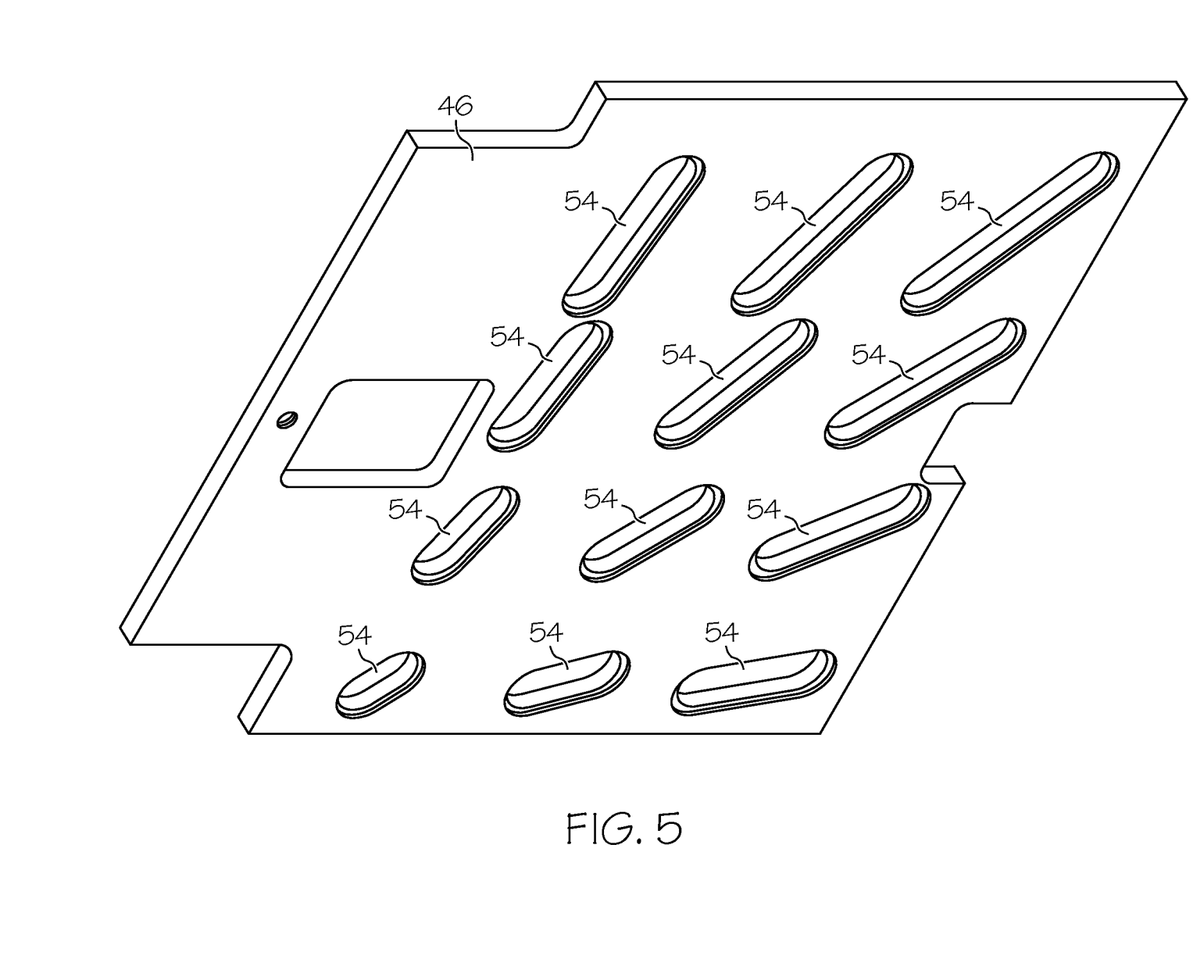
FIG. 5 is a perspective view of an embodiment of an adjustment plate for a packaging machine.

To accommodate more than one size or spacing of product, the gripper head assembly 24 is configured to be adjustable such that a spacing between grippers 48 is changeable. Referring to FIG. 3, the first plate 42 includes a plurality of first plate slots 50. Likewise, as shown in FIG. 4, the second plate 44 includes a plurality of second plate slots 52. Each gripper 48 extends through and is slidably secured in one first plate slot 50 and one second plate slot 52. In some embodiments, the first plate slots 50 are substantially parallel to the second plate slots 52. The first plate slots 50 and second plate slots 52 may extend at an angle to the flow direction 22. It is to be appreciated that individual first plate slots 50 and second plate slots 52 may extend in different directions relative to the flow direction 22 and relative to other first plate slots 50 and second plate slots 52. Each gripper 48 also extends through an adjustment slot 54 in the adjustment plate 46, shown in FIG. 5. Each adjustment slot 54 may be configured to be non-parallel to the corresponding first plate slot 50 and/or the corresponding second plate slot 52, and in some embodiments extend at an angle substantially the reverse of the first plate slots 50 and second plate slots 52. The adjustment slots 54 of FIG. 5 extend substantially linearly, but it is to be appreciated that other embodiments of adjustment slots 54 may be utilized where the adjustment slots 54 extend, for example, curvilinearly.

The adjustment plate 46 is movable relative to the first plate 42 and the second plate 44. In some embodiments, as shown in FIG. 2, the first plate 42 includes one or more guide sleeves 56. A guide rail 58 is slidable through the one or more guide sleeves 56 and is secured to the adjustment plate 46 such that the guide sleeves 56 guide movement of the adjustment plate 46 relative to the first plate 42. Further, one or more latches 60 may be included to retain the adjustment plate 46 in a desired position relative to the first plate 42. The adjustment plate 46 can be moved manually by an operator of the packaging machine 10, or alternatively may be moved via other means, for example, one or more screws such as a lead screw or a ball screw, or a motor, for example, a stepper motor. Further, the means to move the adjustment plate 46 may be integrated into a packaging machine 10 control system to automatically move the adjustment plate depending on the product 20 proceeding through the packaging machine 10.

Figure 6:
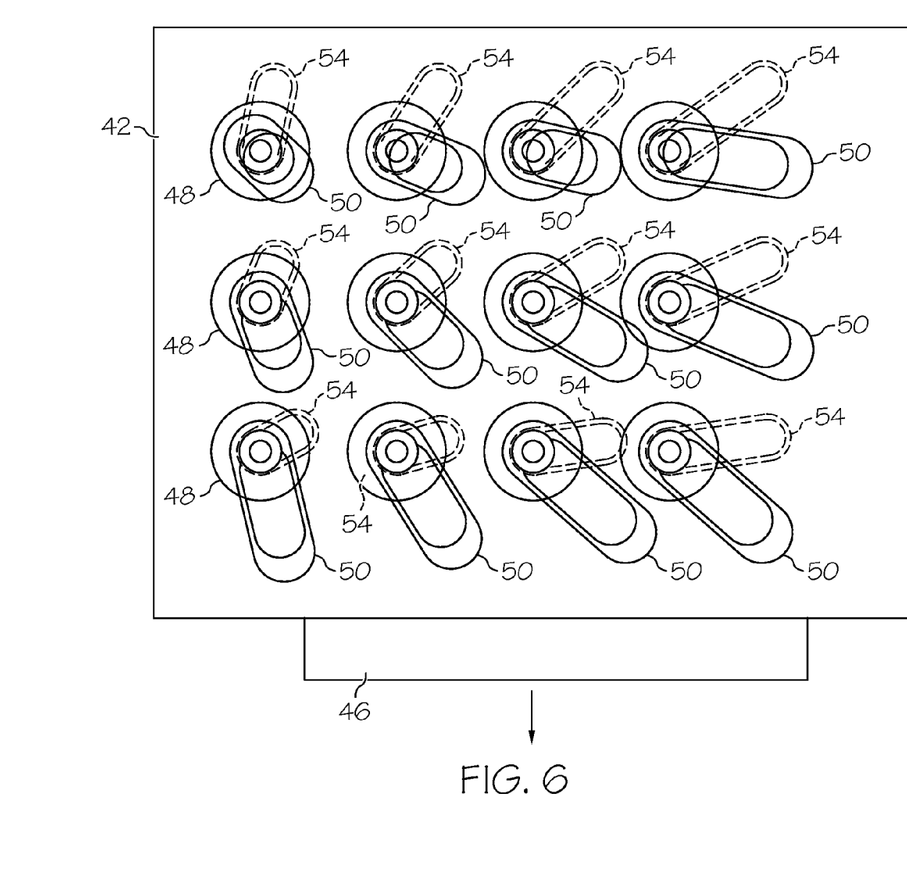
FIG. 6 is a plan view of an embodiment of a gripper head assembly in a first gripper position.
Figure 7:
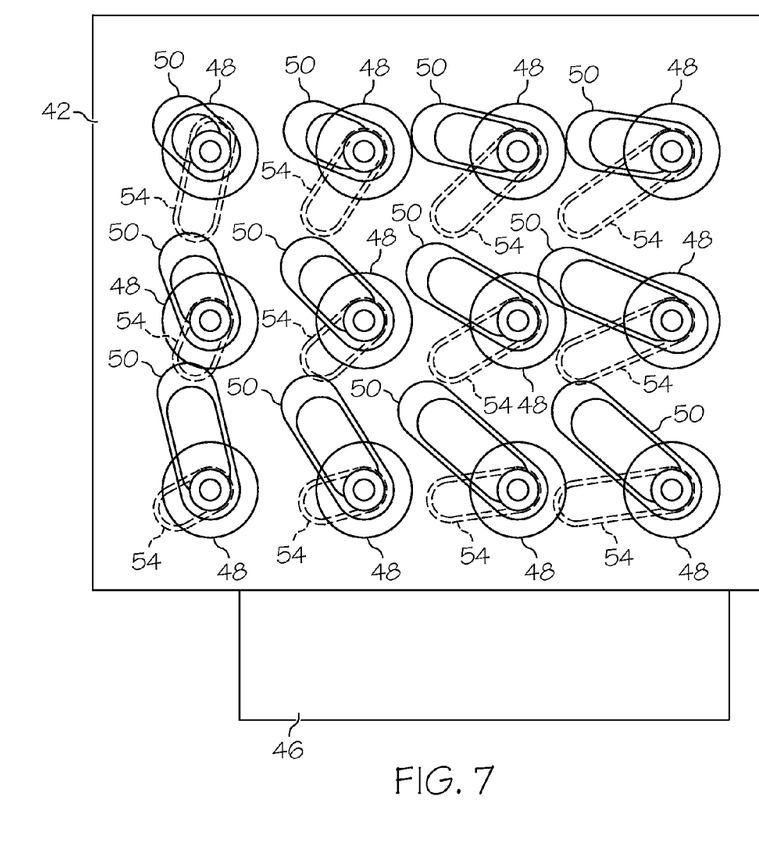
FIG. 7 is a plan view of an embodiment of a gripper head assembly in a second gripper position.

When the adjustment plate 46 is moved from a first position, shown in FIG. 6, to a second position as shown in FIG. 7, the grippers 48 are urged along a length of the first plate slots 50 and second plate slots 52 by the movement of the adjustment plate 46, moving the grippers 48 individually from a first gripper position to a second gripper position, resulting in a second gripper spacing differing from a first gripper spacing. The adjustment plate 46 can then be retained in the second position by engaging latches 60. While the embodiment described herein includes a first gripper position and a second gripper position, it is to be appreciated that other embodiments having more than two gripper positions, for example 2 or 3 intermediate gripper positions between the first gripper position and the second gripper position, are contemplated within the scope of the present disclosure. In such embodiments, additional latches 60 may be included to retain the adjustment plate 46 at these intermediate positions. The gripper head assembly 24 described herein in which the gripper 48 spacing is changeable brings greater flexibility to the packaging machine 10, wherein it is not necessary to have unique gripper head assemblies for each product spacing, and changeover from a first gripper spacing to a second gripper spacing can be accomplished quickly reducing machine downtime.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A gripper head assembly for a product processing machine comprising:
   a gripper support including:
      a first plate;
      a second plate; and
      an adjustment plate disposed between the first plate and the second plate, the adjustment plate including a plurality of adjustment slots; and
   a plurality of grippers slidably secured to the first plate and the second plate, and extending through the plurality of adjustments slots, the plurality of grippers translatable along the plurality of adjustment slots to change a spacing of the plurality of grippers relative to the gripper support.

2. The gripper head assembly of claim 1, wherein translating the adjustment plate relative to the first plate and the second plate changes the spacing of the plurality of grippers between at least a first spacing and a second spacing.

3. The gripper head assembly of claim 1, wherein the plurality of grippers are disposed in a plurality of plate slots in the first plate and the second plate.

4. The gripper head assembly of claim 3, wherein the plurality of slots in the first plate are substantially parallel to the plurality of plate slots in the second plate.

5. The gripper head assembly of claim 3, wherein moving the plurality of grippers in the plurality of plate slots changes the spacing between the plurality of grippers.

6. The gripper head assembly of claim 5, wherein the adjustment slots are nonparallel to the plate slots.

7. The gripper head assembly of claim 1, wherein translating the adjustment plate relative to the first plate and the second plate changes the position of the plurality of grippers in the plurality of adjustment slots, thereby changing the position of the plurality of grippers relative to the plurality of plate slots to change the spacing between the plurality of grippers.

8. The gripper head assembly of claim 1, wherein the plurality of grippers are configured such that increasing a spacing between the first plate and the second plate closes the plurality of grippers around a plurality of product.

9. A product processing machine comprising:
a grid assembly for guiding product to a destination; and
a gripper head assembly for gripping product and guiding the product into the grid assembly, the gripper head assembly including:
a gripper support including:
a first plate;
a second plate; and
an adjustment plate disposed between the first plate and the second plate, the adjustment plate including a plurality of adjustment slots; and
a plurality of grippers slidably secured to the first plate and the second plate, and extending through the plurality of adjustments slots, the plurality of grippers translatable along the plurality of adjustment slots to change a spacing of the plurality of grippers relative to the gripper support.

10. The product processing machine of claim 9, wherein translating the adjustment plate relative to the first plate and the second plate changes the spacing of the plurality of grippers between at least a first spacing and a second spacing.

11. The product processing machine of claim 9, wherein the plurality of grippers are disposed in a plurality of plate slots in the first plate and the second plate.

12. The product processing machine of claim 11, wherein the plurality of slots in the first plate are substantially parallel to the plurality of plate slots in the second plate.

13. The product processing machine of claim 11, wherein moving the plurality of grippers in the plurality of plate slots changes the spacing between the plurality of grippers.

14. The product processing machine of claim 13, wherein the adjustment slots are nonparallel to the plate slots.

15. The product processing machine of claim 9, wherein translating the adjustment plate relative to the first plate and the second plate changes the position of the plurality of grippers in the plurality of adjustment slots, thereby changing the position of the plurality of grippers relative to the plurality of plate slots to change the spacing between the plurality of grippers.

16. The product processing machine of claim 9, wherein the plurality of grippers are configured such that increasing a spacing between the first plate and the second plate closes the plurality of grippers around a plurality of product.

* * * * *